May 24, 1966    M. B. SAMPSON    3,252,708

UNIVERSAL JAW

Filed Nov. 16, 1964

INVENTOR.
MERRITT B. SAMPSON

BY *Watts & Fisher*

ATTORNEYS

3,252,708
UNIVERSAL JAW
Merritt B. Sampson, Shaker Heights, Ohio, assignor to The S-P Manufacturing Corporation, Solon, Ohio
Filed Nov. 16, 1964, Ser. No. 411,450
11 Claims. (Cl. 279—120)

The principles of a universal chuck jaw including chuck inserts of the type employed in the present invention are described in co-pending application entitled Universal Chuck Jaw, Serial No. 277,341, filed May 1, 1963, by Merritt B. Sampson. This is a continuation-in-part of that application disclosing certain improvements and refinements.

This invention relates to chuck jaws and more particularly to an improved chuck jaw including a novel chuck jaw insert.

In the prior application there is a disclosure of chuck jaw inserts which provide a number of advantages. These advantages include: (1) greater gripping power than prior jaws; (2) a wide range of workpiece sizes that can be accommodated; (3) infinite rotative insert adjustment to provide long insert life; and, (4) a workpiece gripping arrangement which holds a workpiece in spaced relation with the jaws thereby increasing jaw life. The present invention incorporates all of these and other advantages of the prior arrangement and, in addition, accommodates an even greater range of workpiece sizes and provides a workpiece "pull back" ability.

In machining many products it is necessary to orient a circular axially extending surface to a radially disposed base surface. Often the base surface is machined first and the workpiece is then chucked for turning the circular surface. In the chucking operation the workpiece is "pulled back" by the action of the jaws bringing the base surface securely against stops to position the workpiece so that the circular surface will be oriented with it axis normal to the radial base surface.

Prior pull back chucks have employed either a rocking jaw principle or in a wedge type chuck, non-radial jaw slide surfaces to effect "pull back." In either type, however, the holding power of the chuck is appreciably reduced as compared with conventional chucks.

With the present invention, circular inserts similar to those of the parent case are constructed with a serrated gripping surface in the form of specialized threads. One face of each thread is disposed radially while the other face is oriented at an angle so that when the chuck is closed the workpiece is forced to retract against stops projecting from the face of the chuck. In this manner a chuck is provided which has both pull back ability and holding power comparable to the superior holding power of the referenced co-pending case.

In chucks of the type disclosed in the parent case, the weakest portion of a jaw insert is in the plane of the face of the jaw. A certain size bore must be provided to accommodate adjusting and clamping bolts. The wall thickness between the work gripping surface and this bore is the limiting factor on the minimum size insert which may be constructed.

The present invention permits a reduction in size in the diameter of the workpiece gripping portion through the provision of a novel insert holding and adjusting construction. A stud is provided which is threaded at both ends. One end threads into the jaw unit and the other into the insert. This permits a reduction in the size of the insert bore. The stud threads at one end are of a pitch different than those on the other to permit rotational insert adjustment.

Accordingly, the object of this invention is to provide novel and improved jaw insert constructions.

Other objects and a fuller understanding of the invention may be had by referring to the following description and claims taken in conjunction with the drawings wherein:

Figure 1:
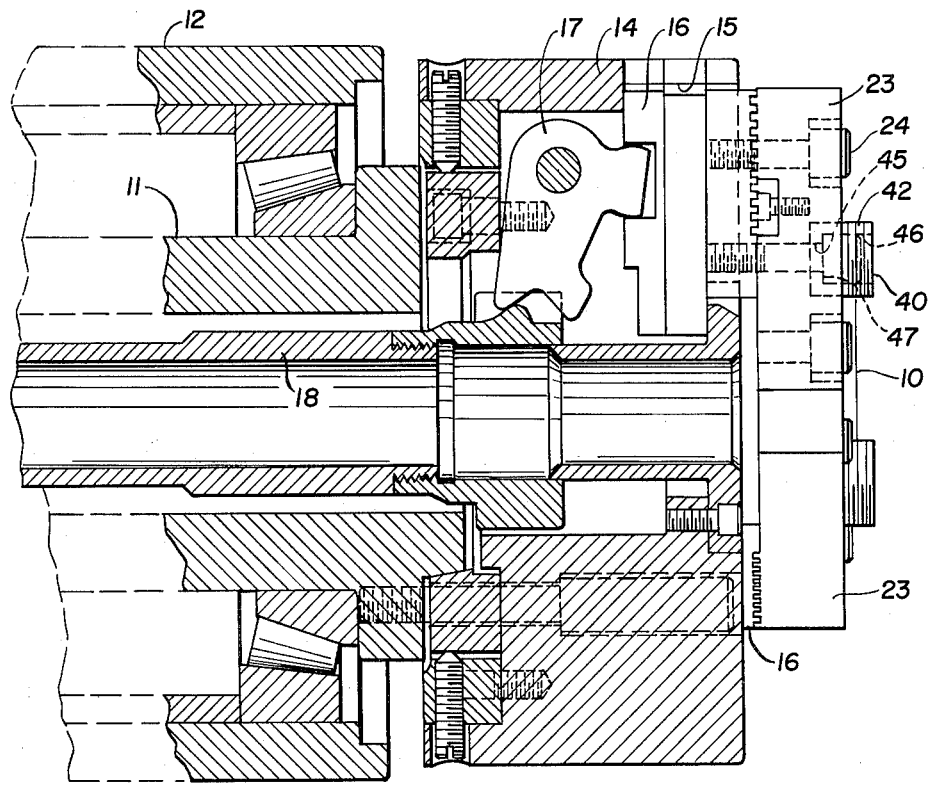
FIGURE 1 is a sectional view of a three-jaw chuck showing two universal jaws.

In FIGURE 1 a lever operated slide jaw chuck is shown generally at 10. The details of construction of the lever operated chuck 10 are more completely described in co-pending application for patent Serial No. 257,002, filed February 7, 1963, by Merritt B. Sampson under the title Adjustable Universal Jaw Chuck.

The chuck 10 is connected to a machine tool spindle 11 journaled in a head stock 12. The spindle 11 and head stock 12 are shown in phantom.

The chuck 10 has a body 14 equipped with a plurality of ways 15. The pictured chuck is a three-jaw chuck having three circumferentially spaced and radially disposed sets of ways, only one of which is shown in the drawings. Each of the ways 15 supports a radially movable, slide 16 which is also of conventional construction. An operating lever 17 engages each of the slides 16. Actuation of a draw tube 18 in a manner described more completely in the above-referenced application moves the levers pivotally and causes the slides 16 to be shifted radially in the ways 15.

Each of the slides 16 has a radially extending T-shaped slot, not visible in the drawings. Each slide 16 has a jaw nut 21 which is slidably disposed in its slot. The jaw nuts 21 each project outwardly past a serrated face 22 of the slide 16. Three jaw bodies 23 are provided. Each jaw body 23 is connected to one of the jaw nuts 21 by a jaw mounting bolt 24 and a jaw mounting stud 54, or as shown in the parent case, a pair of bolts 24.

A jaw key 25 is positioned between each body 23 and its slide 16. The key 25 has an inwardly directed serrated face 26 which is in jaw locating engagement with the serrated face 22 of the slide 16. The key 25 straddles the slot. The key 25 is positioned within a transverse recess 27 in the back of the jaw body 23 and secured to the jaw body by a bolt 28.

Each of the jaw mounting bolts and studs 24, 54 projects through a through bore 30 in the jaw body 23. Each of the bores 30 is counterbored at 31 adjacent face 32 of the jaw body 23. In the preferred and disclosed arrangement, each jaw body 23 is equipped with a third through bore 33 which is threaded to receive an insert mounting bolt 34 or a stud comparable to the stud 54. The third through bore 33 is counterbored at 35 adjacent the face 32 of the jaw body 23. The axes of the counterbores 31, 35 are parallel to one another and to the axes of the chuck. The axes of the counterbores 31, 35 are also aligned along a radius of the chuck and uniformly spaced, radially speaking. The counterbores 31, 35 are carefully formed and identical to one another to provide locating surfaces for inserts as will be described presently.

As described in the parent application, the jaw mounting bolts 24 and the insert mounting bolt 34 are preferably socket head cap screws, equipped respectively with cylindrical heads, 36, 37 of an axial length greater than the depth of the counterbores 31, 35. These heads provide workpiece locating surfaces against which a workpiece may be abutted.

As will be apparent from an examination of the drawings, the disclosed stud 52 replaces one of the bolts 24 and is threaded into the slide 16. As noted above, and as described more fully in the present application, an insert may be selectably connected to the chuck by utilizing a selected one of the bolts 24 connected to the slide 16 or the bolt 34 threaded into the jaw body 23. Thus, when the bolts 24, 34 are used, the insert is connected, by a bolt, to a selected one of the jaw slides and bodies. As will be apparent, a stud can be used to replace a selected one of the bolts 24, 34 when the insert 42a is employed.

Outstanding advantages reside in the present invention comprising workpiece gripping inserts 40, 40a. Each of the inserts 40, 40a has a cylindrically contoured locating portion 41 which telescopes snugly into a selected one of the counterbores 31, 35. As will be seen by a comparative examination of FIGURES 2 through 4 of the parent case, one insert is connected to each jaw body and positioned in any one of the three counterbores. Each insert includes a convex, preferably cylindrical, serrated work gripping surface 42, 42a projecting outwardly from the face 32 of the jaw body 23. Preferably each insert is threaded to provide these serrations.

The insert 40 shown in FIGURE 1 has a work gripping surface 42 of a diameter substantially equal to the diameter of the insert locating surface 41. The insert 40a differs from the insert 40 in that its work gripping surface 42a is somewhat smaller in diameter than the locating surfaces 41 overlying the perimeter of the counterbore in which the insert is positioned. As shown in the parent case, surfaces larger in diameter than 40 may also be provided. It will be apparent that inserts of many work surface diameters could be provided.

As will be apparent from an examination of the drawings in the preceding discussion, the insert of selected size is positioned in the selected one of the counterbores by simply removing the associated bolt or stud disposed in the selected counterbore. The bolt or stud is then projected through a bore 45 in the insert with the bolt head positioned in an insert counterbore 46 and abutting an internal shoulder 47 in the insert. The bolt is then repositioned in its jaw bore and tightened down to clamp the insert in a selected position.

One of the outstanding advantages of the insert shown is that the serrated work surfaces 42, 42a are convex. Thus, no particular orientation of the inserts is prerequisite to the gripping of a workpiece. Moreover, if portions of the serrated surfaces become worn, the insert can be rotated to provide a fresh unworn work gripping surface.

Figure 2:
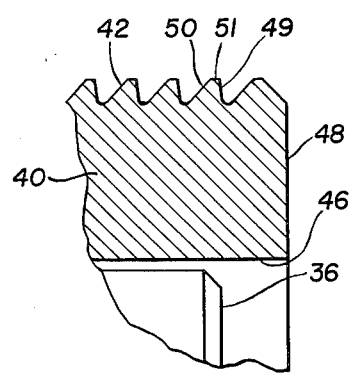
FIGURE 2 is a fragmentary enlarged sectional view of the improved insert serrations of this invention; and, FIGURE 3 is an enlarged sectional view of a chuck jaw and an improved insert.

FIGURE 2 reveals the detail of the serrations on the work gripping surface 42. An exposed face 48 of the insert 40 is the farthest from the jaw body 23. Each tooth serration has a face 49 lying substantially in a radial plane. Each tooth serration also has an oblique face 50 oriented at an angle to the radially disposed face 49. Each serration also has a workpiece penetrating knife edge 51 at the intersection of its radially disposed face 49 and its oblique face 50. Thus, the rearward faces 50 are more nearly cylindrical than are the forward faces 49.

When a workpiece is gripped by the insert 42, the gripping edges 51 bite into the surface of the workpiece. The oblique faces 50 cause the workpiece to shift its position toward the jaw body 23 and become firmly held against the heads 36, 37. This "pull back" of the workpiece having its base surface against the heads 36, 37 assures accurate orientation in turning a circular surface normal to the base surface.

Figure 3:
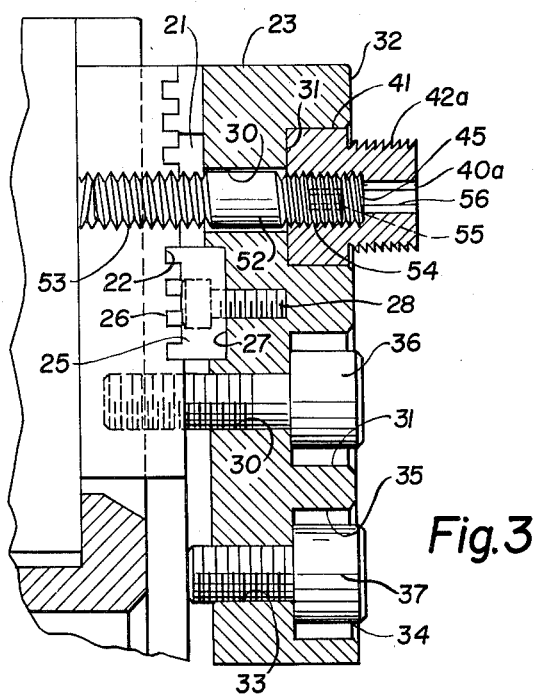

An important aspect of the present invention is disclosed in FIGURE 3. In order to grip a workpice of a particular size, it may become necessary to use an insert 40a having a locating surface 41 of greater diameter than the work gripping surface 42. A stud 52 secures the insert 40a in position. The stud 52 includes dissimilarly pitched threaded portions 53, 54 at opposite ends. An opening 55 for an Allen wrench is included in the face end of the stud 52 for rotating the stud.

The insert 40a has an opening 56 sized for an Allen wrench. The insert may be rotated both for tightening it to lock it in position and for rotative adjustment. The opening 56 is larger than the opening 55 so the wrench to turn the stud may be used without removing the insert.

The reason for having dissimilar threaded portions 53, 54 on the stud 52 is to facilitate the selection of a fresh work abutting surface by rotating the insert 40a. If the threaded portions 53, 54 were identical, a rotation of the stud 52 would have the end result of bringing the insert 40a back to its previous radial position after being tightened down. Loosening the insert and then rotating the stud 52 and shifting the position of the stud outwardly or inwardly from the jaw body 23 permits the insert 40a to be tightened down in a new radial position exposing a fresh work abutting surface.

Although the invention has been described in its preferred form with a certain degree of particularity, it is understood that the present disclosure of the preferred form has been made only by way of example and that numerous changes in the details of construction may be resorted to without departing from the spirit and scope of the invention as hereinafter claimed.

What is claimed is:
1. In a chuck jaw insert comprising:
 (a) a forward work gripping portion having a convexly curved work abutting surface, the surface having an axis for location parallel to an axis of a chuck and disposed outwardly of a face of a chuck jaw body;
 (b) a rearward insert locating portion to be inserted in a matching bore in a chuck jaw; and,
 (c) said work surface being serrated with each serration having forward faces and rearward faces, the rearward faces being more nearly cylindrical than the forward faces whereby on gripping of the workpiece the workpiece will be drawn rearwardly.

2. The device of claim 1 wherein the work abutting surface is endless.

3. The device of claim 2 wherein the forward surfaces are substantially radially disposed and the rearward surfaces are oblique.

4. The device of claim 2 wherein forward portions are threaded to provide the serrations.

5. A chuck comprising:
 (a) a body having a plurality of radially extending jaw ways;
 (b) a plurality of jaw slides each mounted on a different one of the ways for reciprocation thereon;
 (c) a plurality of jaw bodies each mounted on a different one of said slides;
 (d) each jaw body having a plurality of bores disposed generally parallel to the axis of the chuck with certain of the bores being through bores, each of the bores having an aligned counterbore adjacent the face of its jaw body;
 (e) a plurality of studs each associated with a different one of the jaw bodies and disposed in a bore;
 (f) a plurality of bolts projecting through the remaining bores, selected one of the bolts and studs being in the through bores securing the jaw bodies to the slides;
 (g) a plurality of workpiece gripping jaw inserts each projecting into a counterbore of a different one of the bodies and secured there by one of said studs, each insert having a workpiece gripping surface extending axially of the chuck and projecting outwardly of the body;
 (h) each of said studs having one end threaded into a selected one of the jaw bodies and slides and the other end threaded into the secured insert; and,
 (i) the thread on said one end of each stud being of a pitch different than the other end of the same stud.

6. In a machine tool chuck having a plurality of adjustable work gripping jaw assemblies each including a jaw body, the improvement in each assembly comprising:
(a) a stud having first and second threaded portions adjacent its ends;
(b) the pitch of the first threaded portion being different than the pitch of the second;
(c) a rotatably adjustable jaw insert threaded on the first portion;
(d) said second portion being threaded into another portion of the assembly to connect the insert to the remainder of the assembly; and
(e) said stud clamping said insert tightly against the face of one of said jaw bodies.

7. The device of claim 6 wherein the insert has a circular work gripping portion axially aligned with the stud.

8. The device of claim 7 wherein the work gripping portion is serrated.

9. In a machine tool chuck having a plurality of adjustable work gripping jaw assemblies, the improvement in each assembly comprising:
(a) a stud having first and second threaded portions adjacent its ends;
(b) the pitch of the first threaded portions being different than the pitch of the second;
(c) a rotatably adjustable jaw insert threaded on the first portion;
(d) said second portion being threaded into another portion of the assembly to connect the insert to the remainder of the assembly; and
(e) said insert including:
  i. a forward work gripping portion having a convexly curved work abutting surface, the surface having an axis parallel to an axis of the chuck and being disposed outwardly of a face of the jaw assembly;
  ii. a rearward insert locating portion inserted in a matching bore in the assembly; and,
(f) said work surface being serrated with each serration having forward faces and rearward faces, the rearward faces being more nearly cylindrical than the forward faces whereby on gripping of the workpiece the workpiece will be drawn rearwardly.

10. The device of claim 9 wherein the insert forward portion is circular and the forward surfaces are substantially radially disposed and the rearward surfaces are oblique.

11. The device of claim 9 wherein forward portions are threaded to provide the serrations.

References Cited by the Examiner

UNITED STATES PATENTS

| 221,746 | 11/1879 | Skinner | 279—123 |
| 1,685,899 | 10/1928 | Andrew | 279—1X |
| 2,488,822 | 11/1949 | McDonald | 279—123 |

FOREIGN PATENTS 1,015,660  9/1957  Germany.

LESTER M. SWINGLE, *Primary Examiner.*

ROBERT C. RIORDON, *Examiner.*

HAROLD V. STAHLHUTH, *Assistant Examiner.*